United States Patent
He et al.

(10) Patent No.: US 8,503,796 B2
(45) Date of Patent: Aug. 6, 2013

(54) METHOD OF VALIDATING A MEDIA ITEM

(75) Inventors: Chao He, Dundee (GB); Gary A. Ross, Midlothian (GB)

(73) Assignee: NCR Corporation, Duluth, GA (US)

( * ) Notice: Subject to any disclaimer, the term of this patent is extended or adjusted under 35 U.S.C. 154(b) by 1171 days.

(21) Appl. No.: 11/888,683

(22) Filed: Aug. 2, 2007

(65) Prior Publication Data
US 2008/0159614 A1 Jul. 3, 2008

Related U.S. Application Data

(60) Provisional application No. 60/877,839, filed on Dec. 29, 2006.

(51) Int. Cl.
*G06K 9/62* (2006.01)

(52) U.S. Cl.
USPC .......................................................... 382/224

(58) Field of Classification Search
USPC .................. 382/135, 140, 224, 228; 707/722, 707/735, 736, 757
See application file for complete search history.

(56) References Cited

U.S. PATENT DOCUMENTS

| | | | |
|---|---|---|---|
| 5,542,518 A | 8/1996 | Kurosawa et al. | |
| 5,729,623 A | 3/1998 | Omatu et al. | |
| 6,011,866 A * | 1/2000 | Donelly et al. | 382/216 |
| 6,163,618 A | 12/2000 | Mukai | |
| 6,922,489 B2 * | 7/2005 | Lennon et al. | 382/228 |
| 2002/0044677 A1 | 4/2002 | Fox | |
| 2003/0021459 A1 | 1/2003 | Neri et al. | |
| 2003/0081824 A1 * | 5/2003 | Mennie et al. | 382/135 |
| 2003/0217906 A1 | 11/2003 | Baudat et al. | |
| 2004/0183923 A1 | 9/2004 | Dalrymple | |
| 2004/0247169 A1 * | 12/2004 | Ross et al. | 382/137 |

FOREIGN PATENT DOCUMENTS

| | | |
|---|---|---|
| EP | 1 484 719 A2 | 12/2004 |
| EP | 1 217 589 B1 | 2/2007 |

OTHER PUBLICATIONS

Frosini et al., "A Neural Network-Based Model for Paper Currency Recognition and Verification", IEEE Transactions on Neural Networks, 1966.
Kosaka et al., "Bill Classification by Using the LVQ Method", 2001 IEEE International Conference on System, Man and Cybernetics, 2001 (Glory).
Ahmadi et al., "A Study on Evaluating and Improving the Reliability of Bank Note Neuro-Classifiers", SICE Annual Conference in Fukui, Aug. 2003 (Glory).
Ahmadi et al., "A Reliable Method for Classification of Bank Notes Using Artificial Neural Networks", Artificial Life and Robotics, 2004 (Glory).
He C et al., "Employing optimized combinations of on-class classifiers for automated currency validation", Pattern Recognition, Elsevier, Kidlington, GB, vol. 37, No. 6, Jun. 2004, pp. 1085-1096, XP004505313, ISSN: 0031-3203.
Chao et al., "Employing optimized combinations of one-class classifiers for automated currency validation", Pattern Recognition (2004) 1085-1096, The Journal of the Pattern Recognition Society, www.elsevier.com/locate/patcog.

* cited by examiner

*Primary Examiner* — Edward Park
(74) *Attorney, Agent, or Firm* — Peter H. Priest

(57) ABSTRACT

A technique for use in automatic validation of a media item involves accessing a template that comprises multiple one-class classifiers, each corresponding to one of multiple classes to which the media item might belong, and then applying each of the one-class classifiers to an image of the media item to generate a result set for each of the multiple classes. The result set for each media class is then analyzed to assess whether the media item belongs to that class.

17 Claims, 6 Drawing Sheets

FIG. 1
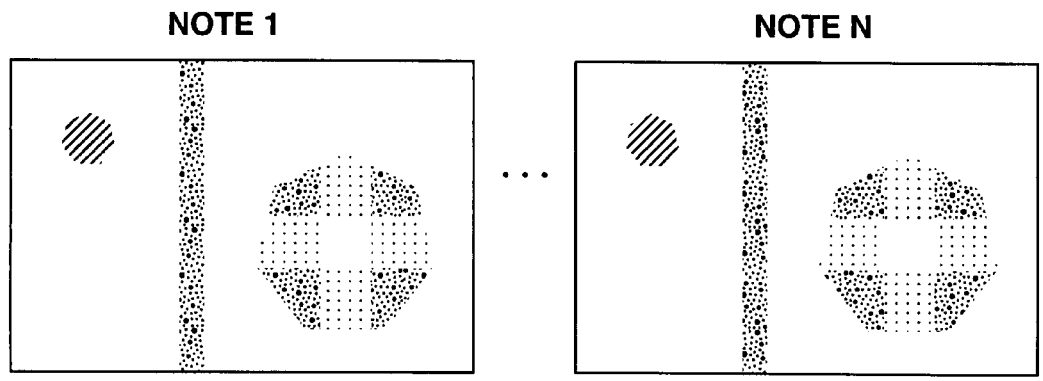
FIG. 2
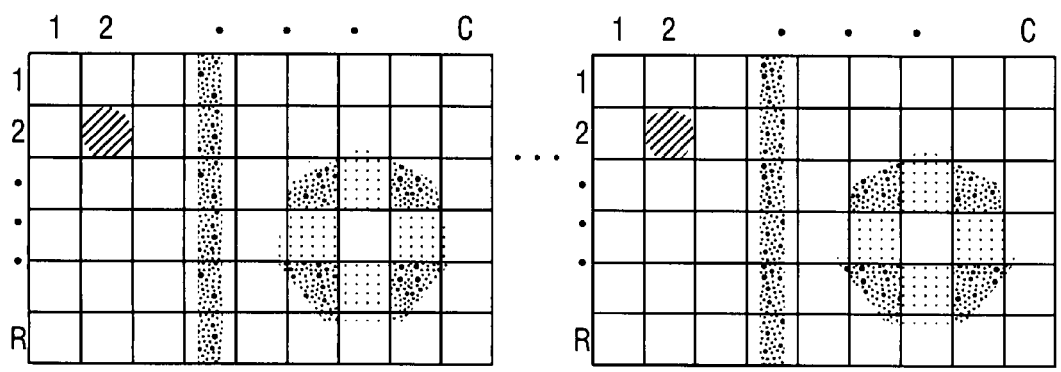
FIG. 3
| $P^1_{11}$ | $P^1_{12}$ | ... | $P^1_{1C}$ | $P^1_{21}$ | ... | $P^1_{2C}$ | ... | $P^1_{R1}$ | ... | $P^1_{RC}$ |
|---|---|---|---|---|---|---|---|---|---|---|
| $P^2_{11}$ | | | | | ... | | | | | $P^2_{RC}$ |
| | | | | | | | | | | |
| ⋮ | | | | | | | | | | ⋮ |
| | | | | | | | | | | |
| $P^N_{11}$ | | | | | ... | | | | | $P^N_{RC}$ |

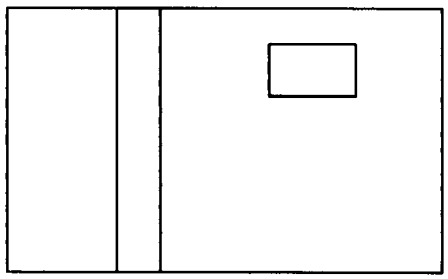
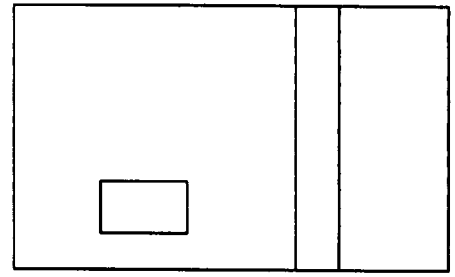
FIG. 7A  FIG. 7B
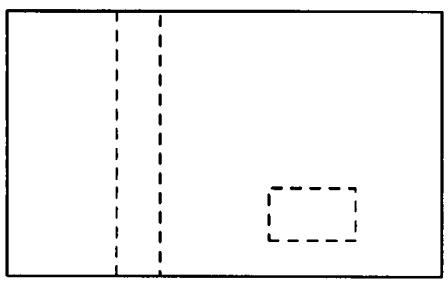
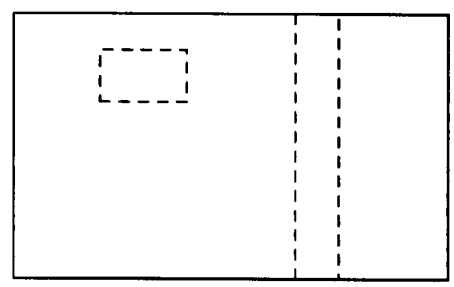
FIG. 7C  FIG. 7D
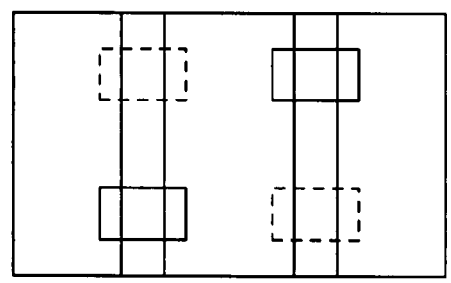
FIG. 8

METHOD OF VALIDATING A MEDIA ITEM

CROSS-REFERENCE TO RELATED APPLICATIONS

This application claims priority from U.S. Provisional Application 60/877,839, filed by Chao He and Gary Ross on Dec. 29, 2006. It is related to U.S. application Ser. No. 11/305,537, titled "Banknote Validation" and filed by Chao He and Gary Ross on Dec. 16, 2005, and to U.S. application Ser. No. 11/366,147, also titled "Banknote Validation" and filed by Chao He and Gary Ross on Mar. 2, 2006.

BACKGROUND

When valuable media items such as bank notes are fed into an automatic handling system, such as banknote sorter or an intelligent deposit or recycling ATM, the system must recognize the items to determine to which of multiple possible classes (e.g., which currency and denomination) each item belongs and, on recognition, must assess whether the item is genuine or counterfeit (i.e., "validate" the item). These systems typically achieve recognition and validation of valuable items by using templates developed previously from training data taken from items of the type to be handled. In practice, a unique template is developed for every unique "class" of media item that the systems are expected to handle. For example, for currency-handling systems, a unique template is created for every possible combination of currency, series, denomination and orientation (i.e., orientation of the bank note upon insertion into the handling system).

Developing a unique template for each class of media item becomes very time consuming and very costly, especially when developing currency handlers for countries having bank notes produced in many series or issued by multiple banks or treasuries. Because most existing validation methods require manual selection of the relevant features (regions) of bank notes by a human expert, the costs of template creation become even more pronounced. In some cases, a new template must be developed even for changes as minor as a new official's signature appearing on a bank note or a slight change in the ink used to print the note.

SUMMARY

Described below is a technique for use in automatic validation of a media item. The technique involves accessing a template that comprises multiple one-class classifiers, each corresponding to one of multiple classes to which the media item might belong, and then applying each of the one-class classifiers to an image of the media item to generate a result set for each of the multiple classes. The result set for each media class is then analyzed to assess whether the media item belongs to that class.

Also described below is a technique for use in creating a template for automated validation of media items. The technique involves receiving images of multiple media items of similar type, where each of the images belongs to one of multiple classes associated with media items of that type. The images are then used to create a single segmentation map that represents media items belonging to all of the multiple classes. The images and the segmentation map are then used together to create multiple one-class classifiers, where each of the one-class classifiers is associated with one of the multiple classes. The template is then defined to include the segmentation map and the multiple one-class classifiers.

Other features and advantages will become apparent from the description and claims that follow.

BRIEF DESCRIPTION OF THE DRAWINGS

FIGS. 1, 2, 3, 4, 5 and 6 together illustrate a process for creating a segmentation map and a feature set matrix for a single class of media items.

FIGS. 7A through 7D show images of a valuable media item, such as a bank note, having four different classes defined by the four possible length-wise orientations in which the item can be inserted into an automatic handling system.

FIG. 8 is a "pseudo-image" showing features of the media item of FIGS. 7A through 7D as they would appear if images of the item in all four orientations were overlaid on one another.

DETAILED DESCRIPTION

Figures 4, 5, 6:
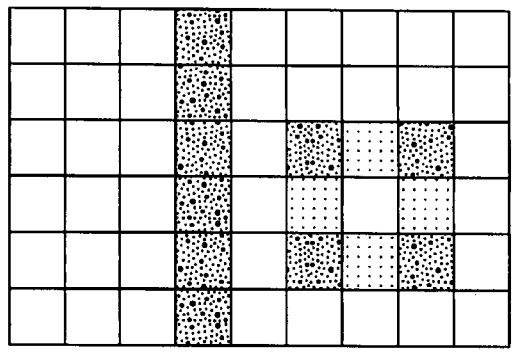

Described below is a technique for use in creating automated media-validation templates and then using these templates in systems that accept any form of valuable media from users of those systems. The technique is particularly useful in automated validation of bank notes in any type of self-service terminal configured to receive bank notes, including automated teller machines (ATMs) with note-deposit capabilities, ticket vending machines, currency-exchange machines, self-service kiosks, and the like. The description below concentrates most heavily on the validation of bank notes, but the techniques are useful in the automated validation of virtually any type of valuable media.

The technique for creating media-validation templates draws upon the template-creation process described in the two related applications that are incorporated by reference above. That process involves the creation of a one-class classifier for use in automated assessment of the validity of a bank note or other valuable media, using a currency template that is built upon a statistical representation of the sub-regions of one or more genuine bank notes, and only genuine bank notes—no statistical representation of counterfeit bank notes is necessary. In other words, the classifier created in that process is a "one-class" classifier in that, in determining the validity of each note, it requires statistical information from genuine notes only and, with this information, concludes either that the note in question does belong to the class (i.e., is "genuine") or does not belong to the class (i.e., is counterfeit).

In general, each note "class" is defined by a particular combination of currency (e.g., U.S. Dollars), denomination (e.g., $5, $10, $20 denominations), series (e.g., a 2003 $5 bill vs. a 2006 $5 bill), and orientation (i.e., front-side right edge first, front-side left edge first, back-side right edge first, back-side left edge first). For a currency having two different denominations of bills, each having been produced under two different series, the currency would require sixteen different one-class classifiers (2 denominations×2 series×4 orientations=16 classes), or sixteen note-validation templates. For each note to be validated, the note would be compared against only one of these sixteen templates—i.e., the template corresponding to the note's denomination, series, and orientation of insertion into the handling system.

The process described below modifies the process of the two related applications to require only a single media-validation template for a given media item, regardless of how many classes might exist for that item. For example, for the currency described above having two denominations each produced under two different series and having sixteen total classes, the process set forth below would not produce sixteen validation templates for the currency, but rather would produce only two templates—one for each denomination of the currency. Each of these templates would be used in assessing the validity of all eight of the classes that exist for one of the two denominations, including the classes that correspond to both production series and to all four note orientations. Before the modifications are described, however, a summary of the process described in the two related applications is in order.

As shown in FIG. 1, the template-creation process involves capturing images of multiple bank notes (Notes 1 to N) for each note class. The images are generated in any of multiple possible image "channels," each representing either the transmission or reflection characteristics of the bank notes when illuminated at a selected frequency or range of frequencies—e.g., red, green, blue, infrared and ultraviolet. As shown in FIG. 2, the images of the notes in each class have an image size determined by the number of pixels contained in each image—an image that is R pixels high and C pixels wide has an image size of R×C.

Each of the pixels in an image has an intensity value P which is easily measured using known techniques. For an image set of N notes having R×C pixels each, the pixel intensity value at the $i^{th}$ row and the $j^{th}$ column of the $n^{th}$ note is represented as $p_{ij}^n$, where i=1, 2, . . . , R; j=1, 2, . . . , C; and n=1, 2, . . . , N. Representing intensity values of the pixels in this manner allows for the creation of an image-intensity matrix like that shown in FIG. 3. In this matrix, the intensity values for all pixels in the image of the first note are aligned in the first row; the intensity values for all pixels in the image of the second note are aligned in the second row; and so on, with intensity values for all pixels in the image of the $N^{th}$ note aligned in the $N^{th}$ row. The result is that the columns of the matrix provide a "pixel-position profile" for all of the images in the class—i.e., each column indicates the intensity values for all pixels in a given position across all of the notes in the class. For example, in the example of FIG. 3, the first column of the matrix indicates the image intensities for all pixels in the first row and first column (upper left corner) of the note images; the last column of the matrix indicates the image intensities for all pixels in the $R^{th}$ row and $C^{th}$ column (lower right corner) of the note images.

A clustering algorithm is then applied to the image-intensity matrix to group the pixel positions into M subgroups, or "segments." To accomplish this, a similarity measure is calculated for every pair of pixel positions using the intensity values for the pixels in each pair, e.g., by calculating the Euclidean distance between column vectors in the matrix. This clustering process takes place in an iterative manner, and, after the results of the algorithm have converged around the M segments, every pixel position is assigned a "membership index" indicating to which of the M segments it belongs. The set of membership-index values across the entire R×C image size form a "segmentation map" for the note class.

FIG. 4 shows a segmentation map for the example of FIGS. 1 and 2 in which the notes are divided into three segments (M=3). Each pixel position in the map is has a numerical value of "1," "2" or "3," where a value of "1" represents very dark pixels, a value of "3" represents very light pixels, and a value of "2" represents pixels that are somewhere between light and dark. This segmentation map applies to all N of the notes in the training set for the note class and, in some systems, is used in the recognition and validation processes with images taken from any and all of the available image channels.

Once the segmentation map has been created for the note class, the map is applied as a mask to extract discriminative information from each of the N images in the class, as shown in FIG. 5. Applying the segmentation map to the image of note n allows for calculation of the average (or mean) intensity value $S_m^n$ for all pixels in the image that belong to each of the M segments, where m=1, 2, . . . , M; and n=1, 2, . . . , N. In the example of FIG. 5, applying the segmentation map creates, for each note, three mean intensity values—$S_1$, $S_2$, and $S_3$—one for each of the three segments defined in the segmentation map.

The mean-intensity values for all of the N notes in the training set are then combined to create a "feature set matrix" F for the note class, as shown in FIG. 6. Each row in the matrix holds the mean intensity values for the M segments of a single one of the notes in the training set. In the example here, the feature set matrix is an N×3 matrix—N notes each having three segments.

The process described below modifies the process shown in FIGS. 1 through 6 by generating a single segmentation map that applies to all classes of a particular media item, such as all series and all orientations of bank notes of a particular denomination in a particular currency, instead of generating one segmentation map for each of the classes. FIGS. 7A through 7D show a valuable media item, such as a bank note, having four different classes defined by the four possible length-wise orientations in which the item can be inserted into an automatic handling system. The solid lines appearing within the media item in FIGS. 7A and 7B represent features that are visible on the surface of the item when it is inserted into the handling system front-side up, where the orientation shown in FIG. 7B represents a 180-degree rotation from the orientation shown in FIG. 7A. FIGS. 7C and 7D represent orientations of the item when it is inserted into the handling system back-side up, with the dashed lines indicating that the features appearing on the front side of the item are not visible in these orientations with the naked eye.

Unlike the process described in the two related applications, in which each segmentation map is created from images of items all belonging to the same class, the process described here creates a segmentation map from images of items belonging to different classes—for example, from images of items having the four orientations shown in FIG. 7A through 7D. To produce such a segmentation map, the training images for all possible classes are processed together, with the resulting image-intensity matrix (see FIG. 3) representing a "pseudo image" that would look something like that shown in FIG. 8—an image showing features of the media item as they would appear if images of the item in all four orientations were overlaid on one another.

Figure 9:
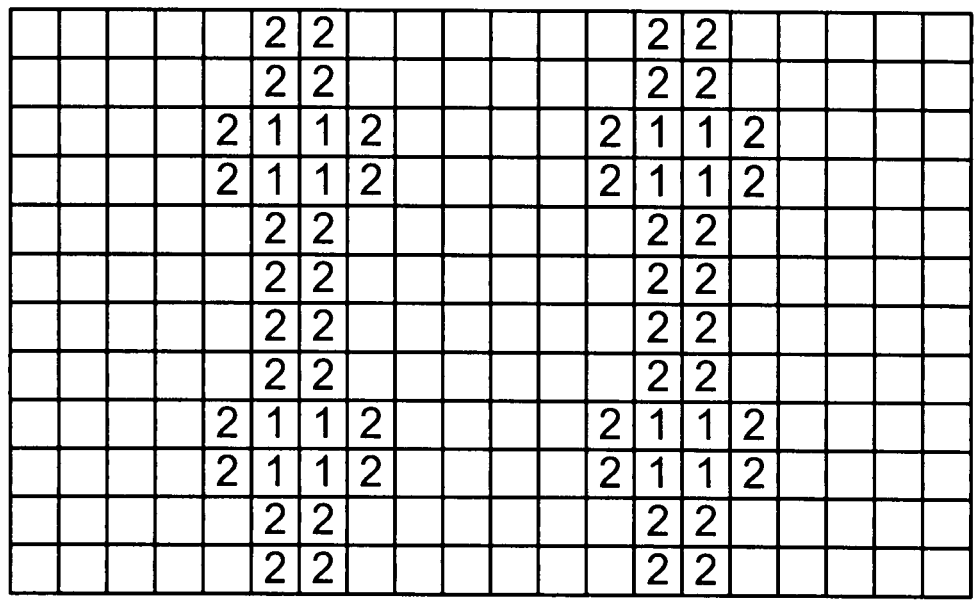
FIG. 9 shows a segmentation map having three segments that would result from the example of FIGS. 7A through 7D.

FIG. 9 shows a segmentation map having three segments that would result from the example of FIGS. 7A through 7D. The first of these segments, having a numerical value of "1" and representing very dark pixel positions, includes four groups of pixel positions having rectangular shapes. The second of these segments, having a numerical value of "2" and representing moderately dark pixel positions, includes two groups of pixel positions running vertically across the note and surrounding the groups that form the first segment. The third segment represents very light pixel positions and includes all of the pixel positions not assigned to the first or second segments.

In order to use a segmentation map like that shown in FIG. 9 and apply the segmentation map across multiple media classes, the template-creation process relies on clustering technologies to create K one-class classifiers that work in conjunction with the segmentation map in the validation process, where K is the total number of classes to be associated with each validation template. In the example given above of a two-denomination currency, the validation template for each denomination would include eight one-class classifiers stored with a single segmentation map.

Figure 10:
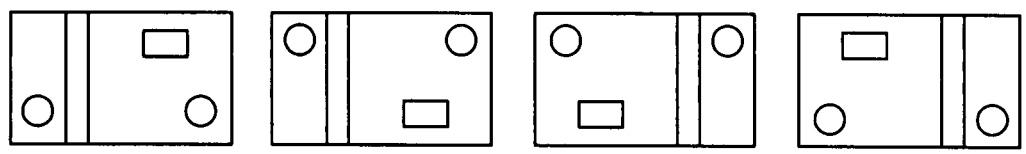
FIG. 10 shows a set of four clusters that would result when a clustering algorithm is applied to the images of FIGS. 7A through 7D.

In general, clustering technologies such as K-means clustering, hierarchical clustering, nearest-neighbor clustering and kernel clustering are used to discover the internal organization of a dataset by finding structure within the data in the form of clusters. The template-creation process described here applies any of these well-known clustering technologies to the images of a media item—including images corresponding to all classes of the item to be covered by a single validation template—to group the image data into several clusters according to a similarity measure defined by the clustering algorithm. In particular, for a media item having K classes to be covered by a single validation template, the clustering algorithm divides the image data into K clusters. For example, for a currency denomination having $N_s$ series of notes in circulation, the number of clusters $K=4N_s$, where four is the number of possible orientations in which a note can be inserted into a handling system. For the example of FIGS. 7A through 7D, the clustering process might produce a set of four clusters looking something those shown in FIG. 10.

Figure 11:
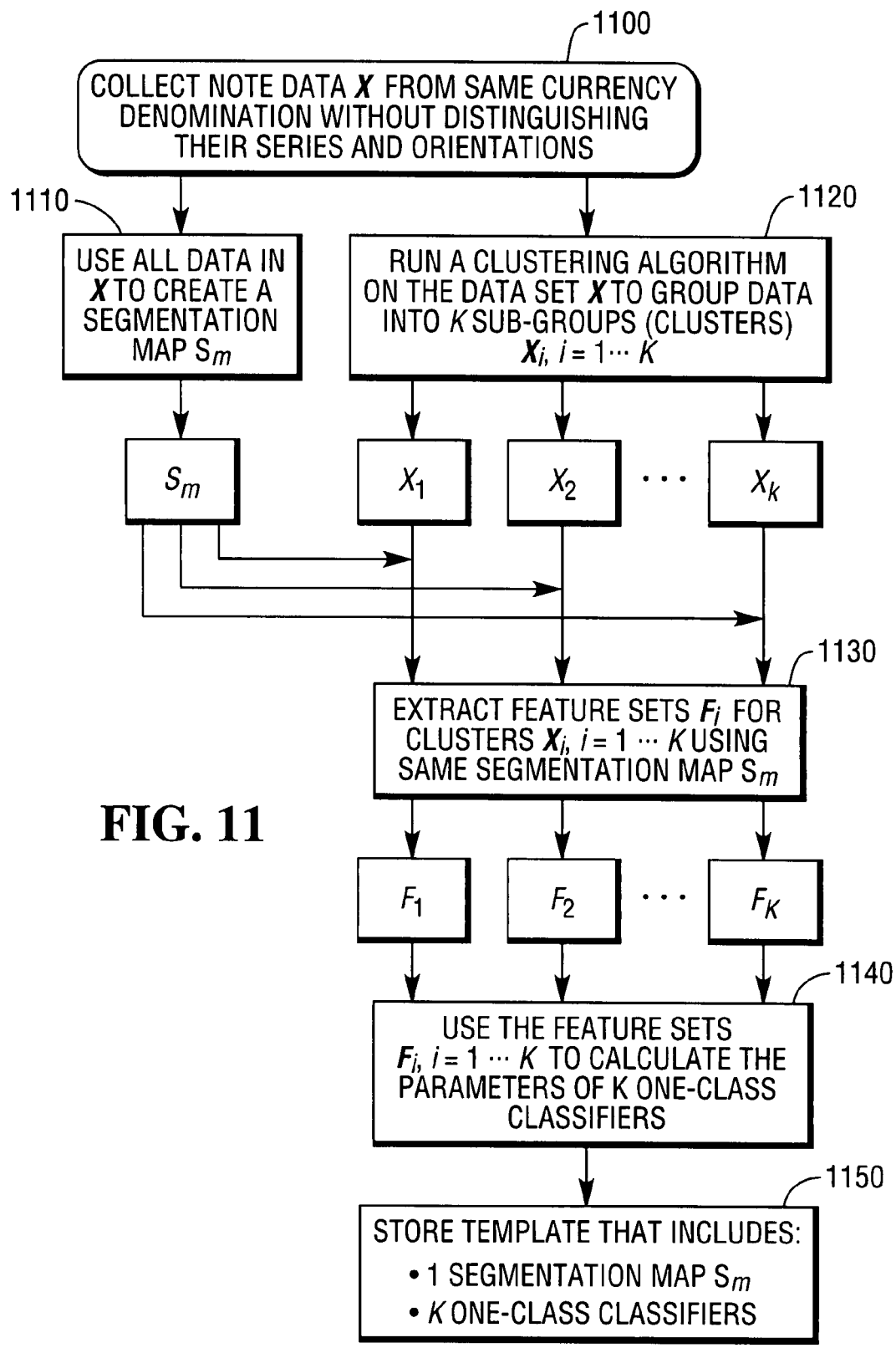
FIG. 11 is a flow diagram showing a process for use in creating a validation template using a segmentation map and cluster data.

FIG. 11 is a flow diagram showing a process for use in creating a validation template using the segmentation map and cluster data described above, for example, a validation template for a denomination of bank notes having K classes to be covered by the template. The process begins when a training system collects a data set X of images from a training set of bank notes of the selected denomination (step 1100). The data set includes images from all of the bank notes of the selected denomination without regard to the classes to which the images belong—e.g., without regard to the production series or orientations of the corresponding notes. The training system then uses the images in the data set X to create a segmentation map $S_m$ for the selected denomination, like the one described above and shown in FIG. 9 (step 1110). The training system also applies a clustering algorithm to the data set X to group the data into K subgroups or clusters $X_i$, where i=1, 2, . . . , K (step 1120).

After creating the segmentation map $S_m$ and the K clusters $X_i$, the training system applies the segmentation map $S_m$ to each of the K clusters $X_i$ to extract feature set matrices $F_i$ for the clusters $X_i$ (step 1130), in the manner described above in connection with FIG. 6. The training system then calculates, for each of the K feature set matrices $F_i$, the mean vector $\mu_i$, the covariance matrix $\Omega_i$, and the critical value $f_{ci}$ (step 1140). The formulas for calculating all three of these elements (mean vector, covariance matrix and critical value) are well known in the art and are not described in any detail here. These three elements together form the parameters of a one-class classifier for each of the K clusters.

Upon calculating the parameters of the one-class classifiers for each of the K clusters, the training set stores these parameters along with the segmentation map $S_m$ as the validation template for the selected currency denomination (step 1150). This validation template is then distributed to note handling systems for use in assessing the validity of bank notes of the currency and denomination associated with the template.

Figure 12:
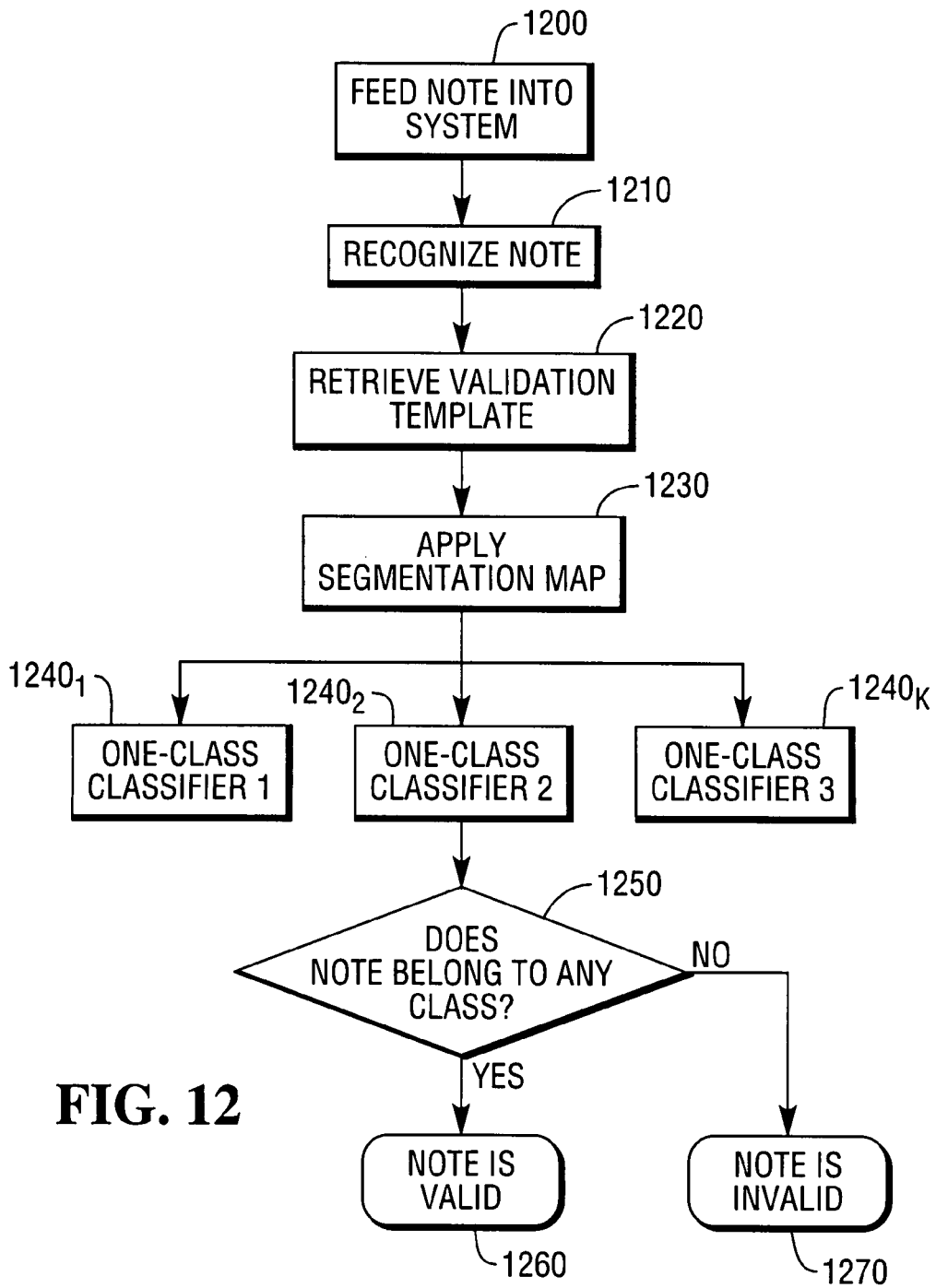
FIG. 12 is a flow diagram showing a process for use in an automated media handling system in assessing the validity of media items of a certain type having multiple classes.

FIG. 12 shows a process for use in an automated media handling system in assessing the validity of media items of a certain type having multiple classes. The process is particularly suited, e.g., for the validation of bank notes of a selected denomination in an automated teller machine (ATM) or a currency-exchange recycler, regardless of the number of production series associated with the denomination or the orientations of the bank notes as they are inserted into the system (i.e., regardless of the number of classes to which bank notes of that denomination may belong).

The validation process begins when the system receives a bank note and creates one or more digital images of the bank note (step 1200). A note-recognition module in the system analyzes the note image and identifies both the currency and the denomination of the note (step 1210). A validation module in the system receives the currency and denomination information from the recognition module and retrieves the appropriate validation template from a prescribed storage location, where the validation template includes the K one-class classifier parameters and the segmentation map described above (step 1220). The validation module applies the segmentation map to the note image to extract a feature set for the note (step 1230). The feature set for an individual note is a vector like those that form the rows of the feature set matrix described above.

The validation module then retrieves the mean vector and covariance matrix stored for each of the K one-class classifiers and uses these parameters, along with the feature set vector for the note, to calculate a test statistical value for the note with respect to each of the K one-class classifiers (steps $1240_{1-K}$). The validation module then compares this value for the note to the critical values stored for each of the K one-class classifiers (step 1250). If the validation module concludes that the test statistical value for the note fulfills the criterion defined by the critical value for one of the K one-class classifiers, then the validation module concludes that the note is a valid note and instructs the handling system to accept the note (step 1260). If, on the other hand, the validation module concludes that the note's test statistical value does not fulfill the criteria defined by the critical values of any of the K one-class classifiers, the validation module concludes that the note is invalid or suspect and instructs the handling system either to return the note to the user or to divert the note to a rejected-note bin (step 1270).

Computer-Based and Other Implementations

The various implementations of the techniques described above are realized in electronic hardware, computer software, or combinations of these technologies. Most implementations include one or more computer programs executed by a programmable computer. In general, the computer includes one or more processors, one or more data-storage components (e.g., volatile and nonvolatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

The text above describes one or more specific embodiments of a broader invention. The invention also is carried out in a variety of alternative embodiments and thus is not limited to those described here. Many other embodiments are also within the scope of the following claims.

We claim:

1. A method for use in automatic validation of a sheet media item, a valid sheet media item having at least two classes, with at least two classes corresponding to two different orientations of the valid sheet media item upon presentation for validation, the method comprising:
    storing in a digital memory a single template that comprises a single segmentation map for the valid media item that applies to both of said at least two classes corresponding to two different orientations, and at least two one-class classifiers for the valid sheet media item that work in conjunction with the single segmentation map, each one-class qualifier corresponding to one of the at least two classes corresponding to two different orientations;
    accessing by a computer the single template;
    applying by the computer each of the one-class classifiers to an image of the sheet media item to generate a result set for each of the multiple classes; and
    for each of the multiple classes, analyzing by the computer the result set and assessing whether the sheet media item belongs to that class.

2. The method of claim 1, further comprising concluding that the sheet media item belongs to none of the multiple classes and, in response, concluding that the sheet media item is not valid.

3. The method of claim 1, further comprising concluding that the sheet media item belongs to one of the multiple classes and, in response, concluding that the sheet media item is valid.

4. The method of claim 1, where the valid sheet media item has at least four classes are associated with each of four orientations in which the sheet media item can be inserted into an automated validation machine.

5. The method of claim 1, where at least two further classes are associated with each of at least two production series in which the valid sheet media item has been produced.

6. The method of claim 1, where the valid sheet media item is a bank note, and where the single template corresponds to a particular currency and a particular denomination to which the bank note belongs.

7. The method of claim 6, where at least two classes are associated with each of two orientations in which a bank note of the particular currency and particular denomination can be inserted into an automatic validation machine.

8. The method of claim 1, where each of two further classes are associated with a different production series in which a bank note of the particular currency and particular denomination has been produced.

9. The method of claim 1, further comprising:
    retrieving from the single template the single segmentation map for the valid sheet media item; and
    applying the segmentation map to the image of the sheet media item to extract a feature set for the image.

10. The method of claim 9, where applying each of the one-class classifiers to the image of the sheet media item includes applying each of the one-class classifiers to the feature set for the image to generate the result set for each of the at least two classes.

11. The method of claim 1, where the single template comprises at least two one-class classifiers that each represents one of multiple feature clusters, where each of the multiple feature clusters is associated with one of the at least two classes to which the sheet media item might belong.

12. The method of claim 1, where the sheet media item is a bank note.

13. The method of claim 1 wherein the single template comprises segments determined at least in part by clustering pixels utilizing measured intensity values of the pixels.

14. The method of claim 1, wherein the segmentation map is created from images of valid sheet media items having all four possible orientations of presentation for validation.

15. The method of claim 1 wherein the valid media sheet item is a bank note, and the method further comprises:
    receiving a bank note by an ATM; and
    creating an image of the bank note.

16. The method of claim 15 further comprising:
    analyzing the image to identify both the currency and denomination of the bank note.

17. The method of claim 16 further comprising:
    utilizing the identified currency and denomination of the bank note to retrieve a single template from digital memory corresponding to the identified currency and denomination.

* * * * *